US009850155B2

(12) United States Patent
Pardo

(10) Patent No.: US 9,850,155 B2
(45) Date of Patent: Dec. 26, 2017

(54) METHOD FOR TREATING ORGANIC WASTE, IN PARTICULAR SLUDGE FROM WASTEWATER TREATMENT PLANTS, AND FACILITY FOR IMPLEMENTING SAID METHOD

(71) Applicant: DEGREMONT, Paris La Defense (FR)

(72) Inventor: Pierre-Emmanuel Pardo, Orsay (FR)

(73) Assignee: DEGREMONT, Paris la Defense (FR)

( * ) Notice: Subject to any disclaimer, the term of this patent is extended or adjusted under 35 U.S.C. 154(b) by 0 days.

(21) Appl. No.: 14/409,043

(22) PCT Filed: Jun. 19, 2013

(86) PCT No.: PCT/IB2013/055033
§ 371 (c)(1),
(2) Date: Dec. 18, 2014

(87) PCT Pub. No.: WO2013/190486
PCT Pub. Date: Dec. 27, 2013

(65) Prior Publication Data
US 2015/0191384 A1 Jul. 9, 2015

(30) Foreign Application Priority Data
Jun. 20, 2012 (FR) ..................... 12 55764

(51) Int. Cl.
C02F 9/00 (2006.01)
C02F 3/00 (2006.01)
(Continued)

(52) U.S. Cl.
CPC .................. C02F 9/00 (2013.01); C02F 1/72 (2013.01); C02F 1/722 (2013.01); C02F 1/727 (2013.01);
(Continued)

(58) Field of Classification Search
CPC .. C02F 1/461; C02F 3/28; C02F 3/286; C02F 9/00; C02F 11/04; C02F 11/10;
(Continued)

(56) References Cited

U.S. PATENT DOCUMENTS 5,141,646 A * 8/1992 Rozich ..................... C02F 1/025
210/613
5,846,425 A * 12/1998 Whiteman ............ C02F 3/1221
210/606

(Continued)

FOREIGN PATENT DOCUMENTS

DE 4418060 11/1995
DE 19858187 9/1999
(Continued)

OTHER PUBLICATIONS

Corresponding International Search Report for PCT/IB2013/055033 dated Nov. 29, 2013.

Primary Examiner — Katherine Zalasky
Assistant Examiner — Benjamin Lebron
(74) Attorney, Agent, or Firm — Young & Thompson

(57) ABSTRACT

The invention relates to a method for treating organic waste, in particular to a method for treating sludge from wastewater treatment plants, in order to produce power and/or hygienized organic matter, including a first step of mesophilic or thermophilic digestion (13) of at least one fraction of a stream of organic waste, and comprising the following steps: dehydrating (15) all of the digested and non-digested waste; aerated thermal hydrolysis (16) of the dehydrated waste, including an injection of an oxidizing agent in a quantity lower than the stoichiometric quantity for oxidizing organic matter, and setting to the required temperature by a heating means; and a second mesophilic or thermophilic digestion (17) of the stream of hydrolyzed waste.

22 Claims, 3 Drawing Sheets

(51) Int. Cl.
   *C02F 1/72*   (2006.01)
   *C02F 3/28*   (2006.01)
   *C02F 11/04*  (2006.01)
   *C02F 11/12*  (2006.01)
   *C02F 11/08*  (2006.01)
   *C02F 11/18*  (2006.01)
   *C02F 11/10*  (2006.01)

(52) U.S. Cl.
   CPC .............. *C02F 3/006* (2013.01); *C02F 3/28* (2013.01); *C02F 3/286* (2013.01); *C02F 11/04* (2013.01); *C02F 11/08* (2013.01); *C02F 11/10* (2013.01); *C02F 11/12* (2013.01); *C02F 11/18* (2013.01); *C02F 2209/001* (2013.01); *C02F 2209/003* (2013.01); *C02F 2209/06* (2013.01); *C02F 2209/14* (2013.01); *C02F 2209/245* (2013.01); *C02F 2301/08* (2013.01); *C02F 2301/106* (2013.01); *C02F 2303/10* (2013.01); *Y02E 50/343* (2013.01); *Y02W 10/12* (2015.05); *Y02W 10/23* (2015.05); *Y02W 10/30* (2015.05)

(58) Field of Classification Search
   CPC ...... C02F 11/18; C02F 3/006; C02F 2209/06; C02F 2209/14; C02F 2209/245; C02F 2209/001; C02F 2209/003; C02F 11/08; C02F 11/12; C02F 2301/08; C02F 2301/106; C02F 2303/10; C02F 1/72; C02F 1/722; C02F 1/727
   See application file for complete search history.

(56) References Cited

U.S. PATENT DOCUMENTS

| | | | | |
|---|---|---|---|---|
| 6,325,935 | B1* | 12/2001 | Hojsgaard | C02F 11/04 165/299 |
| 6,783,679 | B1* | 8/2004 | Rozich | C02F 3/006 210/614 |
| 2005/0194311 | A1* | 9/2005 | Rozich | C02F 1/461 210/614 |
| 2008/0147241 | A1* | 6/2008 | Tsangaris | C03B 5/005 700/273 |
| 2008/0283468 | A1* | 11/2008 | Logan | B01F 3/04517 210/603 |
| 2009/0107913 | A1* | 4/2009 | Johnson | C05F 5/008 210/604 |
| 2009/0200231 | A1* | 8/2009 | Walton | C02F 1/008 210/631 |
| 2011/0056260 | A1* | 3/2011 | Lemaire | B09B 3/00 71/9 |
| 2011/0114570 | A1* | 5/2011 | Hojsgaard | C02F 11/18 210/752 |
| 2014/0051903 | A1* | 2/2014 | Cansell | C02F 11/086 588/320 |

FOREIGN PATENT DOCUMENTS

| | | | |
|---|---|---|---|
| DE | 19937876 | 3/2001 | |
| DE | 102006038450 | 4/2007 | |
| DE | 102007037202 | 2/2009 | |
| FR | 2942792 | 9/2010 | |
| FR | WO 2012095391 A1 * | 7/2012 | ............ C02F 11/086 |
| WO | 2013190486 | 12/2013 | |

* cited by examiner

METHOD FOR TREATING ORGANIC WASTE, IN PARTICULAR SLUDGE FROM WASTEWATER TREATMENT PLANTS, AND FACILITY FOR IMPLEMENTING SAID METHOD

PRIORITY

Priority is claimed as a national stage application, under 35 U.S.C. §371, to international application No. PCT/IB2013/055033, filed Jun. 19, 2013, which claims priority to French application FR1255764, filed Jun. 20, 2012. The disclosures of the aforementioned priority applications are incorporated herein by reference in their entirety.

BACKGROUND OF THE INVENTION

Field of the Invention

The invention relates to a process for treating organic waste, in particular sludge from wastewater treatment plants, in order to produce energy and/or render organic matter hygienic, comprising a first step of mesophilic or thermophilic digestion of at least one fraction of a stream of organic waste.

The field of the invention is that of the digestion of organic waste, in particular that which is produced during water treatment.

Description of the Related Art

The term "biogas" will subsequently denote the gas resulting from the digestion process. This biogas comprises a mixture essentially consisting of methane, carbon dioxide and water.

The term "difficult sludge" will denote any organic matter of which the mesophilic digestion at 35-40° C. for 20 days does not make it possible to convert into biogas, consisting of methane, more than 40% of the organic matter initially present.

The term "easy sludge" will denote any organic matter of which the mesophilic digestion at 35-40° C. for 20 days makes it possible to reduce the organic matter present by more than 40%.

The digestion of organic matter is a very efficient way of producing energy. This is why it is undergoing considerable development. However, it has a certain number of drawbacks:
1. Large size of the facility so as to have a substantial residence which enables "difficult" organic matter to be converted into methane. The organic molecule hydrolysis step is the limiting step.
2. Only a fraction of the organic matter can be converted into methane. In particular, the cell walls which are in the organic matter are difficult to digest. The overall yields of facilities for converting organic matter to sludge are rarely greater than 50%.
3. It is necessary to heat the digesters in order to keep them up to temperature, which consumes energy.

Thermal hydrolysis processes are set up in order to counteract drawback No. 2. By virtue of thermal hydrolysis, a larger fraction of the organic matter can be digested in a shorter time, since the hydrolysis is no longer a limiting step, and the organic matter, in particular the cell walls, are decomposed and become digestible.

The hydrolysis also makes it possible to reduce the viscosity of the sludge, thereby making it possible to digest high concentrations of sludge in the digester while at the same time having uniform stirring.

However, thermal hydrolysis processes also have drawbacks:
very expensive facility, said expense depending on the flow rate which passes through these facilities,
very expensive exploitation since it is necessary to heat the sludge with energy, sometimes noble energy.

The aqueous ammonia produced proportionally to the amount of organic matter digested is a poison for the digestion at high concentrations. This phenomenon therefore prevents the use of high concentrations of organic matter in the digester, thereby reducing the advantage of concentrating the dry matter so as to reduce the size of the thermal hydrolysis. The digestion yields, even amplified ("boosted"), rarely exceed 50%.

Wet oxidation (WO) processes are also known. Generally, the overall yield of biogas production does not exceed 30% of the initial organic matter. Furthermore, these WO processes have drawbacks:
very expensive facility, said expense depending on the flow rate which passes through these facilities,
problems with the heat exchangers requiring the temperature to be raised sufficiently high for the combustion reaction to generate itself.

US 2005/0194311 discloses a process for treating organic waste comprising a two-phase digester: a first reactor performs the acidification hydrolysis function, and a second reactor performs the methanogenesis. It is the combination of the two reactors which forms a digester and performs digestion, i.e. methane production from organic matter. The fact that there is only one "digestion system", which digests both the hydrolyzed sludge and the nonhydrolyzed sludge, limits the destruction yield. The system according to US 2005/0194311 does not provide fundamentally more than a hydrolysis upstream of the digestion system.

SUMMARY OF THE INVENTION

The aim of the invention is especially to provide a process of the type previously defined which makes it possible to improve the production of energy and of matter rendered hygienic, without requiring excessive facility and exploitation costs.

According to the invention, the process for treating organic waste, in particular the process for treating sludge from wastewater treatment plants, in order to produce energy and/or organic matter which has been rendered hygienic, comprises a first step of mesophilic or thermophilic digestion of at least one fraction of a stream of organic waste, and is characterized in that it comprises the following steps:
dehydration of all of the digested and nondigested waste,
aerated thermal hydrolysis of the dehydrated waste, with the injection of an oxidizing agent in an amount lower than the stoichiometric amount for oxidizing the organic matter, and setting to the required temperature via a heating means,
and a second mesophilic or thermophilic digestion of the stream of hydrolyzed waste, separate from the first digestion step.

The invention defined comprises a system made up of the following successive steps:
a first digestion,
a dehydration,
a hydrolysis,
a second digestion.

Preferably, the amount of oxidizing agent injected is between 10% and 50%, in particular between 20% and 30%, of the stoichiometric amount.

The means of heating during the thermal hydrolysis is advantageously made up of at least one injection of steam. As a variant, this heating means could be made up of a circulation of hot fluid around the external shell of a hydrolysis reactor, or of at least one electrical resistance in this reactor.

Advantageously, after the aerated thermal hydrolysis, and before the second digestion, the stream of waste is subjected to cooling by heat exchange making it possible to reuse the heat exiting the aerated thermal hydrolysis for the heating of the digesters.

A part, preferably less than 50%, of the hydrolyzed sludge is recycled, at the hydrolysis output, to the first digestion.

During the thermal hydrolysis, the organic waste is heated at a temperature between 90 and 240° C., under a pressure of 1 to 45 bar, for 5 to 90 minutes. Preferably, during the aerated thermal hydrolysis, the temperature is between 120° C. and 200° C., in particular equal to 160° C., while the pressure is between 4 and 12 bar, in particular equal to 8 bar.

The injection of oxidizing agent can be controlled by measuring carbon dioxide $CO_2$ in the gaseous headspace of a hydrolysis reactor and staging of the injection is carried out so as to provide a homogeneous hydrolysis reaction.

A dilution of the waste stream can be carried out by injecting water into the stream, upstream of the inlet of the second digester so as to control the operation of the second digestion.

It is possible to provide for a regulation of the heating means, in particular of the injection of steam, by controlling the temperature in the gaseous headspace of the hydrolysis reactor.

The duration of the first digestion, and likewise that of the second digestion, are advantageously between 7 and 19 days, preferentially 14 or 15 days under mesophilic conditions.

A regulation of the dilution can be carried out according to the aqueous ammonia content and the pH of the waste exiting the second digestion.

Preferably, the stream of organic waste exiting the thermal hydrolysis undergoes a heat exchange so as to provide heat to a loop of water, in particular while regulating the temperature of the organic waste exiting the thermal hydrolysis and the dilution.

Regulation of the temperature of the waste exiting the thermal hydrolysis and the dilution is advantageously envisioned for preheating the sludge at the entry of the first digestion.

The regulation of the temperature of the sludge, or of the waste, at the entry of the first digestion can be provided by heating with the loop of water, and/or by exchange with the hydrolyzed sludge.

The biogas produced by digestion is advantageously used as fuel in cogeneration for producing energy and heat, and the heat from the flue gases from combustion of the biogas at the outlet of one or more cogeneration units is used through an exchanger in order to provide the energy required for the aerated thermal hydrolysis.

It is also possible to envision using the heat at the outlet of one or more cogeneration units through an exchanger in order to provide the energy required for heating the digester.

It is advantageous to envision the addition of a pretreatment, before the aerated thermal hydrolysis, in order to remove the tow and the grit according to the quality of the sludge to be treated.

During the aerated thermal hydrolysis, stirring is envisioned, enabling the homogenization of the sludge and of the injected oxidizing agent.

During the hydrolysis, an injection of acid or of base may be carried out such that an acidic pH of less than 4, preferably less than 2, is established by injecting acid, while a basic pH of greater than 10, preferably less than 12, is established by injecting a base.

The invention also relates to a facility for the implementation of a process as previously defined, this facility comprising a first mesophilic or thermophilic digester of at least one fraction of a stream of organic waste, and being characterized in that it comprises:
  a dehydrator of all of the digested and nondigested waste,
  a reactor for aerated thermal hydrolysis of the dehydrated waste, with means for injection of an oxidizing agent and a heating means for setting to the required temperature,
  and a second mesophilic or thermophilic digester of the stream of hydrolyzed waste, separate from the first digester.

According to the invention, the two distinct and separate digesters constitute two chambers each producing methane.

The means for heating during the thermal hydrolysis is advantageously made up of at least one steam injection.

As a variant, this heating means could be made up of a circulation of hot fluid around the external shell of the hydrolysis reactor, or of at least one electrical resistance in this reactor.

Advantageously, the facility comprises a heat exchanger through which the stream exiting the aerated thermal hydrolysis reactor passes and which makes it possible to reuse the heat for heating the sludge entering the digesters.

A means for injecting water into the stream, upstream of the inlet of the second digester, is envisioned in order to dilute the stream, and to control the operation of the second digester.

Preferably, the facility comprises a loop of water heated through a heat exchanger by the stream of organic waste exiting the thermal hydrolysis.

The facility preferably comprises at least one cogeneration unit for the combustion of the biogas produced by digestion and for producing energy and heat. An exchanger is envisioned at the outlet of one or more cogeneration units, so as to have biogas combustion flue gases pass through it and to provide the energy required for the aerated thermal hydrolysis and/or for heating the digester.

The aerated thermal hydrolysis reactor comprises a vertical shell, with entry of the waste in the lower part, means for heating the content of the shell, and means for injecting an oxidizing agent at least into the lower part, and preferably at a higher level.

The heating means may comprise means for injecting steam at least into the lower part, and preferably about halfway up. As a variant, the heating means may comprise a circulation of hot fluid around the external shell of the hydrolysis reactor, or at least one electrical resistance in this reactor.

The hydrolysis reactor also comprises a mechanical or physical stirring device (baffle, recirculation pumping, stirring, etc.) enabling the homogenization of the sludge and of the injected oxidizing agent.

The facility may comprise a means for regulating the pH in the hydrolysis reactor by injecting an acid or a base in order to improve the hydrolysis kinetics.

BRIEF DESCRIPTION OF THE DRAWING FIGURES

The invention consists, apart from the arrangements set out above, of a certain number of other arrangements to which reference will be more explicitly made hereinafter with respect to an implementation example described with reference to the attached drawings, but which is in no way limiting. On these drawings.

DETAILED DESCRIPTION OF THE INVENTION

The process of the invention aims to produce energy and/or organic matter which has been rendered hygienic. The description which follows is given using, in the interest of simplification, the term "sludge" which should be understood in a very general sense which is not limited to sludge from wastewater treatment plants, but which applies to any stream of organic waste.

Figure 1:
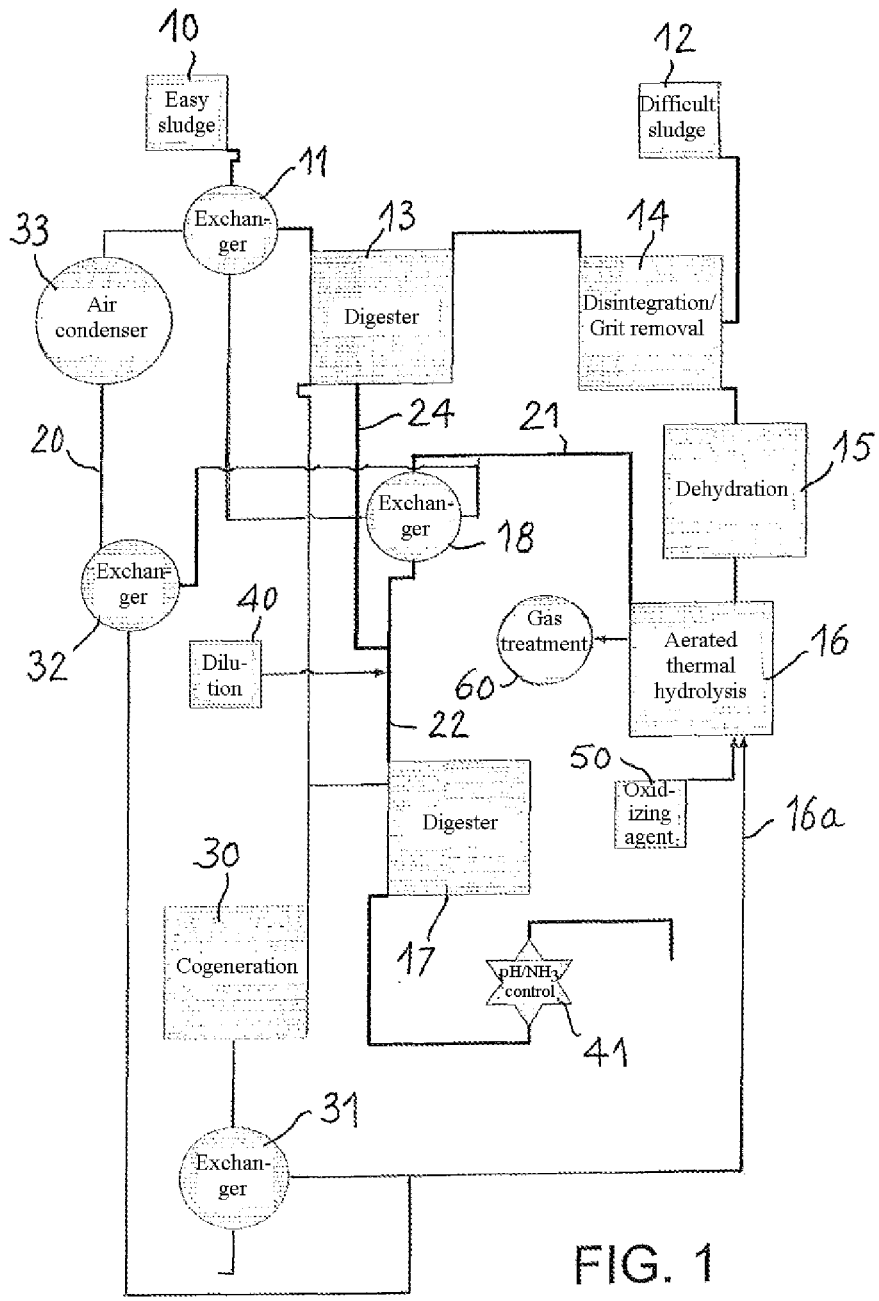
FIG. 1 is a diagrammatic representation in block form of a facility for implementing a process according to the invention.

Referring to the drawings, in particular to FIG. 1, it can be seen that the sludge to be treated is categorized into two categories: easy sludge 10, and difficult sludge 12, as initially described.

A fraction of the stream of sludge, corresponding at least to the easy sludge 10, undergoes heating in a heat exchanger 11. The exchanger 11 is of the water-sludge type, and acts on the stream of nonhydrolyzed sludge, entering a digestion step in a digester 13.

It should be noted that the difficult sludge 12 can also pass through this exchanger 11 if it is digested in the digester 13.

The exchanger 11 makes it possible, using the heat recovered from the sludge exiting 21 the aerated thermal hydrolysis, to preheat the sludge entering the digester 13 so as not to have to heat the latter continuously.

The first digestion step in the digester 13 may be mesophilic, corresponding to an operating temperature between 30° C. and 45° C., preferably between 35° C. and 40° C., or thermophilic, corresponding to an operating temperature between 50° C. and 60° C.

The digester 13 treats at least the easy sludge and a fraction of the cooled hydrolyzed sludge, forming a stream 24. Depending on the economic balance of the assembly, the digester 13 can also treat a part or all of the difficult sludge 12. The digester 13 is dimensioned for a residence time of between 9 and 19 days, preferentially 14 days under mesophilic conditions. The digester has its own backup heating circuit (not represented).

The digested sludge exiting the digester 13 is mixed with the difficult sludge 12, for the case where said difficult sludge was not introduced into the digester 13. This mixing can be carried out in an apparatus for pretreating 14 all of the digested sludge and difficult sludge in order to remove the tow and the grit which may disrupt the aerated thermal hydrolysis. The apparatus 14 may comprise a disintegrator and also a grit remover, depending on the quality of the sludge, in order to protect the downstream equipment.

All of the digested and nondigested sludge is then subjected to a dehydration in a dehydrator 15. This dehydration makes it possible to reduce the volume of sludge to be treated by the aerated thermal hydrolysis and therefor the energy consumptions. The dehydration is carried out to 10-20% of dry matter (ratio of the weight of the dry matter to the total dry matter+liquid weight), preferentially to 17% of dry matter in order to optimize the size of the aerated thermal hydrolysis according to the technology used and in order to optimize the size of a second digester 17. This value of 17% makes it possible to reconcile a sludge viscosity which is not too high and an acceptable economic cost of the facility.

The dehydrated sludge is then subjected to an aerated thermal hydrolysis in a hydrolysis reactor 16, with injection of an oxidizing agent 50 (oxygen, and/or ozone, and/or hydrogen peroxide, or air by default) and the injection of steam 16a in order to heat to the required temperature. The aerated thermal hydrolysis can be carried out batchwise or continuously.

During this hydrolysis, the sludge is heated at a temperature between 90 and 240° C., under a pressure of 1 to 45 bar, for 5 to 90 minutes in the presence of a small amount of oxidizing agent (air, oxygen, ozone) in order to hydrolyze and oxidize the organic molecules and to break the cell membranes. The amount of oxidizing agent injected is less than the stoichiometric amount for the total oxidation of the waste, i.e. ensuring the conversion of the carbon of the organic matter into carbon dioxide $CO_2$. Preferably, the amount of oxidizing agent injected is between 10% and 50%, in particular between 20% and 30%, of the stoichiometric amount. The oxygen $O_2$ added via the oxidizing agent is partly consumed for breaking the molecules and producing COH and COOH bonds, and partly for producing carbon dioxide $CO_2$.

The reduced amount of oxidizing agent injected, while improving the hydrolysis and the breaking of the molecules, makes it possible to preserve organic matter suitable for undergoing a digestion and for producing biogas, while avoiding complete conversion of the carbon of the molecules into carbon dioxide.

The heating at the desired temperature during the aerated thermal hydrolysis is advantageously provided by direct injection of steam into the matter undergoing hydrolysis. This injection of steam makes it possible to dispense with heating of the matter undergoing hydrolysis by passing it through a heat exchanger. Preferably, the temperature is between 120° C. and 200° C., in particular equal to 160° C., while the pressure is between 4 and 12 bar, in particular equal to 8 bar.

The injection of steam 16a in order to heat at the desired temperature is controlled by measuring the temperature in the gaseous headspace of the hydrolysis reactor. The injection of steam is reduced or eliminated if the temperature exceeds a predetermined limit, maximum of 240° C., whereas the injection is increased if the opposite is true.

The injection of oxidizing agent is controlled by measuring carbon dioxide $CO_2$ in the gaseous headspace. A staging of the injection of oxidizing agent is envisioned in order to ensure a homogeneous hydrolysis reaction.

Figure 2:
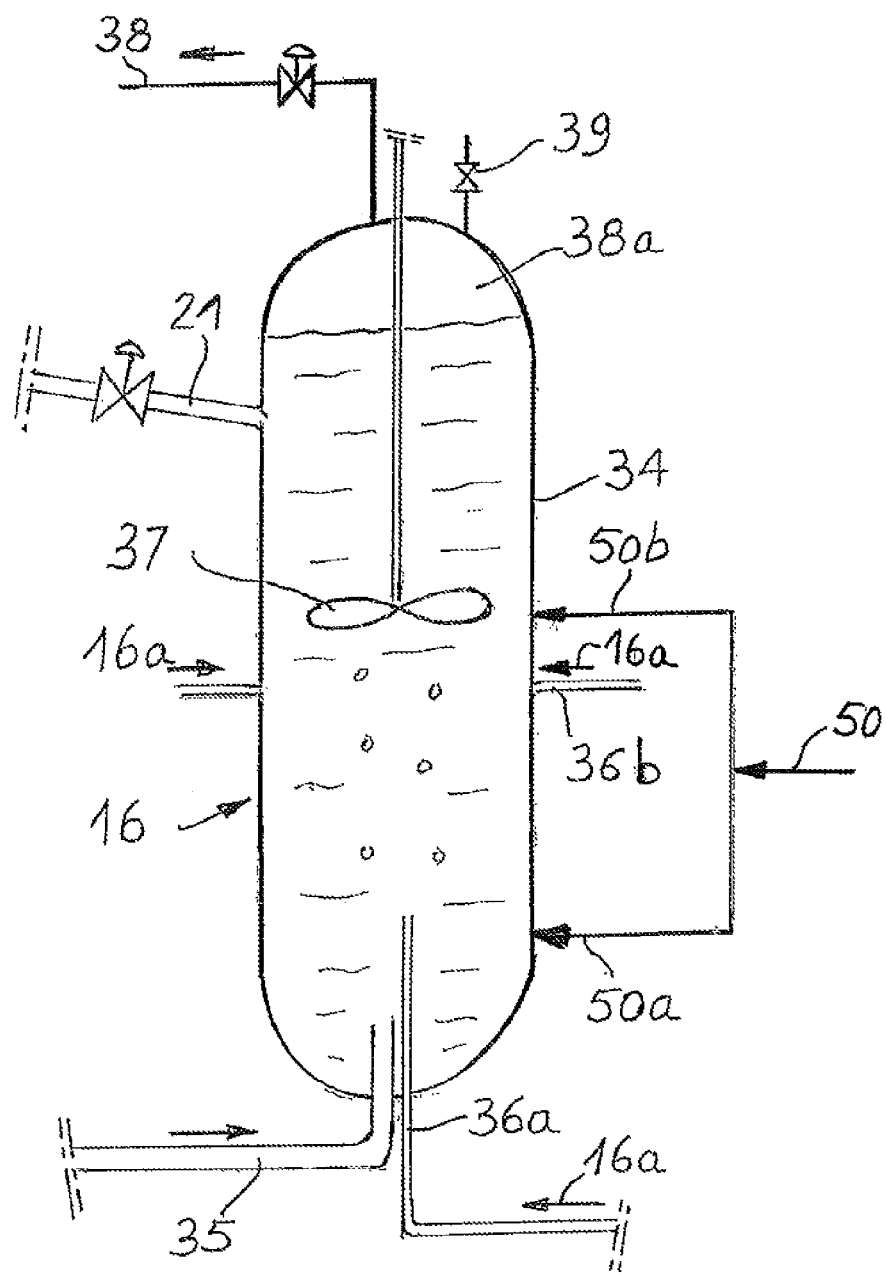
FIG. 2 is a diagram of an aerated hydrolysis reactor according to the invention.

The sludge in the hydrolysis reactor is in the liquid state. A device is envisioned for stirring the sludge in the reactor. The stirring device may be mechanical or physical: the stirring may be provided by recirculation pumping, or statically by means of baffles. Mechanical stirring, in particular by means of a propeller as seen in FIG. 2, is also possible. The stirring enables the homogenization of the sludge and the injected oxidizing agent.

The facility comprises a circuit or loop 20 of thermal fluid, preferentially water.

The loop 20 of thermal fluid comprises the heat exchanger 18 in which the hydrolyzed sludge is cooled so as to reach the temperature (35° C. to 65° C.) required for the operation of a second digester 17, according to a dilution 40 applied to the sludge by injecting water into the sludge.

The loop 20 can be split into two different loops, one comprising the exchanger 11 and the other comprising the exchanger 18, in such a way that the heating and cooling functions are always provided.

Figure 3:
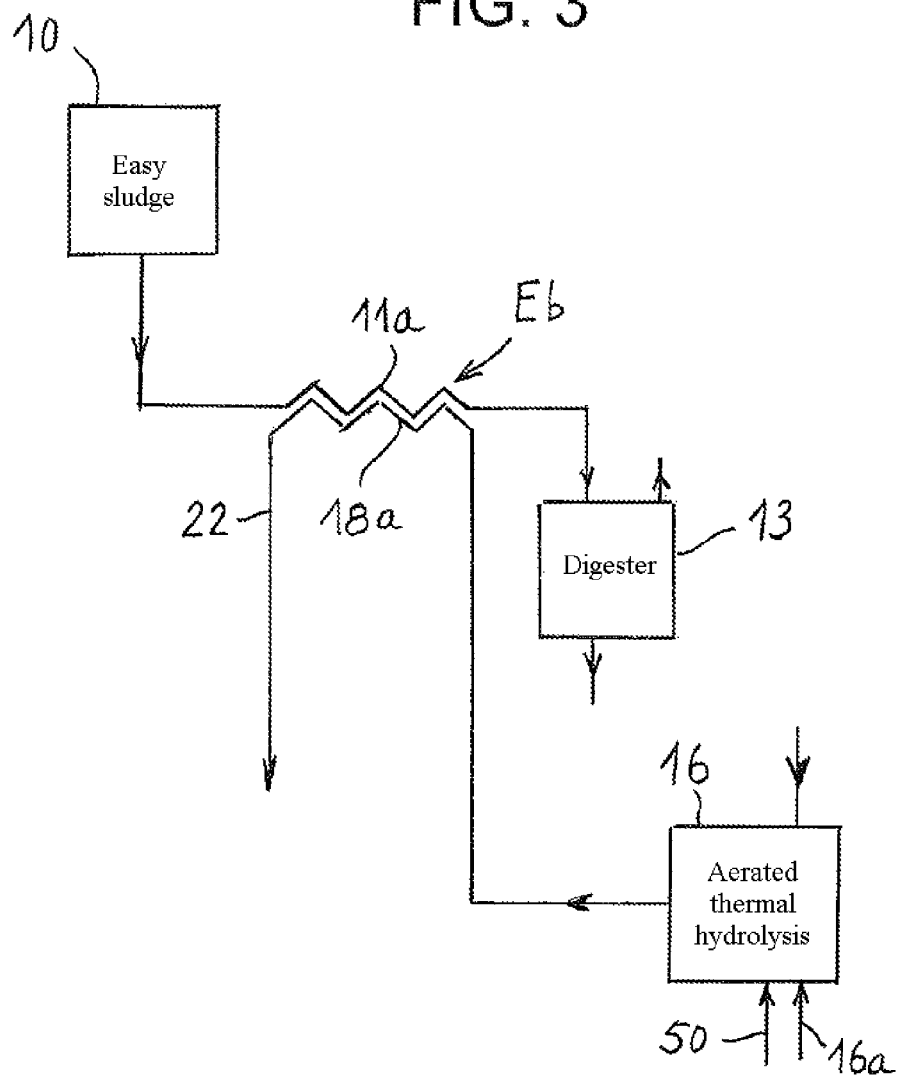
FIG. 3 is a partial diagram of an exchanger implementation variant.

The regulation of the temperature at the entry of the digester 17 can be carried out by means of a circuit (not represented) for bypassing the exchanger 18 via the loop of water 20. Depending on the dimensioning of the two digesters 13, 17, the exchangers 11 and 18 may become common, in the form of a sludge/sludge exchanger Eb, according to FIG. 3, with section 18a of hot sludge, originating from the hydrolysis reactor 16, transmitting the heat to the sludge to be treated passing through a section 11a thermally coupled to the circuit 18a.

The loop 20 also comprises the heat exchanger 11. The heat supplied to the loop 20 of thermal fluid makes it possible to heat the sludge at the inlet of the digester 13 in a controlled manner, through this exchanger 11.

The loop 20 also comprises a heat exchanger 32 between the water of the loop and steam obtained from the heat produced by a cogeneration unit 30. In the event of a need for heat in the sludge at the outlet 23 of the exchanger 11, the steam produced is used to heat the loop of hot water 20.

The loop 20 also comprises, for the case where there is a surplus of heat, a cooler 33 of the air condenser type, or water/water exchanger or any other type of cooler, which makes it possible to cool the loop of water such that the exchanger 18 always performs its role of cooling the sludge.

A circulation 24 of cooled hydrolyzed sludge, preferably less than 50%, is advantageously envisioned in the digester 13 in order to increase the overall biogas conversion yield and to reduce the dilution 40 imposed by the aqueous ammonia concentrations in the digester 17.

The dilution 40 is carried out by injecting water, downstream of the exchanger 18 and of the bypass pipe 24 to the digester 13, and upstream of the digester 17. This dilution, in particular, is carried out according to the continuously measured concentration of the amount of aqueous ammonia at the outlet of the digester 17. The dilution is increased when the amount of aqueous ammonia at the outlet increases, and conversely in the event of a decrease. This regulation makes it possible to optimize the operation of the digester 17 by guaranteeing operating conditions which are always optimal.

The hydrolyzed sludge, after dilution 40, is subjected to a second digestion in the mesophilic or thermophilic second digester 17. The digester 17 recovers a part of the hydrolyzed sludge, since another part is recycled to the first digester 13. The digester 17 is dimensioned for a residence time of between 9 and 19 days, preferentially 15 days under mesophilic conditions. The digester 17 has its own backup heating circuit, not represented.

A control 41 of the pH and of the ammonia $NH_3$ content of the sludge is carried out at the outlet of the digester 17, or in a recirculation loop of the digester. This control makes it possible to verify that the digester 17 is always under optimal operating conditions. In the event of the value of the free ammonia $NH_3$ in the sludge being too high, the dilution 40 is opened, i.e. increased, so as to reestablish the equilibrium.

The biogas, essentially methane, produced in the digesters is sent to an assembly 30 made up of one or more cogeneration units which make it possible to use, optionally after treatment, the biogas which serves as a fuel for energy production purposes. The cogeneration unit may be a simple boiler or an electricity-heat cogeneration unit.

The facility advantageously comprises a steam production unit 31 on the outlet of one or more cogeneration units. The unit 31 may be made up of an exchanger of heat between flue gases from the cogeneration unit and steam. This steam is used to feed the thermal hydrolysis with thermal energy, but also to supplement the heat required for the digester 13, either by heating the heat loop 20 through an exchanger 32, or by heating the internal heating loop (not represented) of the digester 13.

It is also possible to envision a means for regulating the pH in the hydrolysis reactor by injecting an acid or a base in order to improve the hydrolysis kinetics. An acidic pH of less than 4, preferably less than 2, is established by injecting acid, while a basic pH greater than 10, preferably less than 12, is established by injecting a base. When such an injection of acid or base is carried out, the heating of the hydrolysis reactor can be reduced, without the hydrolysis yield being lowered.

An appropriate gas treatment 60 is envisioned for the gases ($CO_2$, volatile organic compounds VOCs) exiting the thermal hydrolysis and which potentially cannot be directed to the digestion.

FIG. 2 is a diagrammatic vertical section of an aerated thermal hydrolysis reactor 16 according to the invention. The reactor comprises a vertical cylindrical shell 34 designed to withstand the pressure prevailing during the hydrolysis. The dehydrated sludge is introduced in the lower part of the reactor via a tube 35. The sludge temperature at the entry of the reactor 16 can be approximately 200° C.

The steam 16a is introduced via injection means 36a, in particular injection nozzles, at least in the lower part of the reactor, and preferably via other injection means 36b approximately halfway up the reactor. The steam can be at a temperature of approximately 200° C. under a pressure of 12 bar.

The oxidizing agent 50, in particular oxygen, is preferably injected at several points, in particular a bottom point with injection means, or nozzle, 50a and a point approximately halfway up with injection means 50b.

The device for stirring the matter contained in the reactor 16 may be mechanical and may comprise for example a propeller 37 carried by a rotating vertical shaft which passes through the upper wall of the reactor in a leaktight manner. As a variant, the stirring device may consist of a recirculation pump on the reactor; injection of oxidizing agent is then advantageously carried out in the recirculation loop. According to another variant, the stirring device may comprise baffles.

A pipe 38, equipped with an automatic valve, starting from the upper part of the reactor, makes it possible to discharge, to the treatment 60, gases originating from the gaseous headspace 38a of the reactor. The temperature of these gases can be approximately 200° C. A safety valve 39 is installed on the upper wall of the reactor. The pipe 21 for discharging the hydrolyzed sludge opens into the reactor 16 below the level of separation between the gaseous headspace 38a and the mass of hydrolyzed matter.

The invention provides many advantages.

During the aerated hydrolysis, the oxygen or any other oxidizing agent present makes it possible to reduce the parasitic reactions resulting in refractory products, such as Maillard reactions.

Compared with a simple digestion or with a thermal hydrolysis-assisted digestion, the invention makes it possible to obtain:

- an increase in the amount of biogas produced, it being possible for the yield of conversion of the organic matter into biogas to go above 70%; this is due to the reduced amount of oxidizing agent injected which makes it possible, while breaking the molecules, to avoid converting all the organic carbon into $CO_2$ and to preserve organic matter suitable for undergoing digestion and for producing biogas,
- a decrease in the amount of final residue, which can go above an 80% reduction in the organic matter,
- a sludge which is very easy to dehydrate and has been completely rendered hygienic,
- a decrease in digester size, therefore a decrease in costs,
- a cost virtually identical to that of a thermal hydrolysis-assisted digestion since the reactor sizes are identical and only the means for injecting an oxidizing agent: air, oxygen, ozone, are added.

Finally, the invention also provides as advantages:

- a decrease in the amount of biogas used for energy purposes (heating of the aerated thermal hydrolysis, heating of the digester) by virtue of the reductions defined above and effective looping of energy,
- optimization of the operation of the digesters by regulation of the dilution at the entry of the final digester,
- reliability of the operation process,
- a decrease in the size of the thermal hydrolysis,
- a decrease in energy consumption both for the thermal hydrolysis and for the digestion.

According to the invention, the first digester 13 is dimensioned in such a way that the digestion yield is optimized. Depending on the easy sludge used, this dimensioning will be for from 7 to 19 days, preferentially 14, under mesophilic conditions, instead of the 20 days normally used. The fraction of hydrolyzed sludge recycled will be taken into account in the residence time.

Likewise, the second digester 17 is dimensioned with an optimized digestion time according to the digestion, namely between 7 and 19 days, preferentially 15 days, under mesophilic conditions, instead of the 20 days normally used.

These times are a compromise between the equilibrium of the digestion (equilibrium of the bacteria populations) and the yield achievable by the digestion.

Thus, compared with a conventional digestion of 20 days, for a sludge consisting of 50% by volume of easy sludge and 50% by volume of difficult sludge, at a concentration of 5% DM, the digestion volume is decreased by more than 30%. The amount of biogas produced is increased by more than 50%.

The invention claimed is:

1. A process for treating organic waste or for treating sludge from wastewater treatment plants, in order to produce energy and/or organic matter which has been rendered hygienic, comprising:
    - a first step of mesophilic or thermophilic digesting of at least one fraction of a stream of organic waste in a first mesophilic or thermophilic digester;
    - dehydrating all of the digested and nondigested waste, the dehydration being carried out to 10-20% of dry matter;
    - aerated thermal hydrolyzing of the dehydrated waste, with the injection of an oxidizing agent in an amount between 10% and 50% of the stoichiometric amount for the oxidation of the organic matter, and setting to the required temperature via a heater, the oxidizing agent being at least one selected from the group consisting of oxygen, ozone, hydrogen peroxide and air, the injection of oxidizing agent being in stages controlled by measuring $CO_2$ in a headspace of a hydrolysis reactor, the oxidizing agent being injected at several points including a bottom of the hydrolysis reactor and half way up the hydrolysis reactor; and
    - a second mesophilic or thermophilic digesting of the stream of only hydrolyzed waste in a second mesophilic or thermophilic digester, separate from the first digestion step.

2. The process as claimed in claim 1, wherein the heater comprises at least one steam injector.

3. The process as claimed in claim 1, wherein, after the aerated thermal hydrolysis, and before the second digestion, the stream of waste is subjected to cooling by heat exchange making it possible to reuse the heat exiting the aerated thermal hydrolysis for heating the first and the second digesters.

4. The process as claimed in claim 1, wherein a part of the hydrolyzed sludge is recycled, at the output of the aerated thermal hydrolysis, to the first digestion.

5. The process as claimed in claim 1, wherein, during the aerated thermal hydrolysis, the organic waste is heated at a temperature between 90 and 240° C., under a pressure of 1 to 45 bar, for 5 to 90 minutes.

6. The process as claimed in claim 5, wherein, during the aerated thermal hydrolysis, the temperature is between 120° C. and 200° C., while the pressure is between 4 and 12 bar.

7. The process as claimed in claim 1, wherein staging of the injection of the oxidizing agent is carried out in order to provide a homogeneous reaction.

8. The process as claimed in claim 1, wherein an injection of water into the stream of waste is carried out upstream of an inlet of the second digester in order to provide a dilution of the stream and to control the operation of the second digestion.

9. The process as claimed in claim 2, further comprising a regulation of the injection of steam by controlling the temperature in a gaseous headspace of a hydrolysis reactor.

10. The process as claimed in claim 1, wherein the duration of the first digestion, like that of the second digestion, is between 7 and 19 days, under mesophilic conditions.

11. The process as claimed in claim 8, wherein a regulation of the dilution is carried out according to an ammonia content and a pH on exiting the second digestion.

12. The process as claimed in claim 8, wherein the stream of organic waste exiting the thermal hydrolysis undergoes a heat exchange in order to supply heat to a loop of water, with regulation of the temperature of the organic waste exiting the aerated thermal hydrolysis and the dilution.

13. The process as claimed in claim 12, wherein a regulation of the temperature of the sludge is provided at an entry into the first digestion, by heating with a loop of water, and/or by exchange with the hydrolyzed sludge.

14. The process as claimed in claim 1, wherein biogas produced by digestion is used as fuel in cogeneration for producing energy and heat, and in that the heat from the flue gases of the biogas at the outlet of one or more cogeneration units is used through an exchanger in order to provide the energy required for the aerated thermal hydrolysis.

15. The process as claimed in claim 14, wherein a use of the heat at the outlet of one or more cogeneration units, through an exchanger, in order to provide the energy required for heating the first and second digesters.

16. The process as claimed in claim 1, further comprising pretreating aimed at removing the tow and grit according to the quality of the sludge to be treated.

17. The process as claimed in claim 1, wherein, during the aerated thermal hydrolysis, an injection of acid or a base is carried out such that an acidic pH of less than 4, is attained by injecting acid, while a basic pH greater than 10, is attained by injecting a base.

18. The process as claimed in claim 1, wherein the amount of oxidizing agent injected is between 20% and 30 of the stoichiometric amount.

19. The process as claimed in claim 5, wherein, during the aerated thermal hydrolysis, the temperature is equal to 160° C., while the pressure is 8 bar.

20. The process as claimed in claim 1, wherein, during the hydrolysis, an injection of acid or a base is carried out such that an acidic pH of less than 2, is attained by injecting acid, while a basic pH less than 12, is attained by injecting a base.

21. The process as claimed in claim 1, wherein the dehydration is carried out to 17% of dry matter.

22. A process for treating organic waste or for treating sludge from wastewater treatment plants, in order to produce energy and/or organic matter which has been rendered hygienic, consisting of:

a first step of mesophilic or thermophilic digesting of at least one fraction of a stream of organic waste in a first mesophilic or thermophilic digester;

dehydrating all of the digested and nondigested waste, the dehydration being carried out to 10-20% of dry matter;

aerated thermal hydrolyzing of the dehydrated waste, with the injection of an oxidizing agent in an amount between 10% and 50% of the stoichiometric amount for the oxidation of the organic matter, and setting to the required temperature via a heater, the oxidizing agent consisting of at least one selected from the group consisting of oxygen, ozone, hydrogen peroxide and air, the injection of oxidizing agent being in stages controlled by measuring $CO_2$ in a headspace of a hydrolysis reactor, the oxidizing agent being injected at several points including a bottom of the hydrolysis reactor and half way up the hydrolysis reactor; and a second mesophilic or thermophilic digesting of the stream of only hydrolyzed waste in a second mesophilic or thermophilic digester, separate from the first digestion step.

* * * * *